(12) United States Patent
Xiao et al.

(10) Patent No.: US 8,761,547 B2
(45) Date of Patent: Jun. 24, 2014

(54) COMPUTING DEVICE AND METHOD FOR AUTOMATICALLY TYPESETTING PATENT IMAGES

(75) Inventors: Wei-Qing Xiao, Shenzhen (CN); Chung-I Lee, New Taipei (TW); Chien-Fa Yeh, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 267 days.

(21) Appl. No.: 13/337,119

(22) Filed: Dec. 25, 2011

(65) Prior Publication Data

US 2012/0183222 A1    Jul. 19, 2012

(30) Foreign Application Priority Data

Jan. 14, 2011    (CN) .......................... 2011 1 0007622

(51) Int. Cl.
 *G06K 7/10*      (2006.01)
 *G06K 9/18*      (2006.01)
 *G06K 9/68*      (2006.01)
 *G06K 9/32*      (2006.01)

(52) U.S. Cl.
 USPC ........... 382/321; 382/182; 382/218; 382/219; 382/297

(58) Field of Classification Search
 CPC .......... G06K 9/00442; G06K 9/00469; G06K 9/00476
 USPC ........................................ 382/321, 219, 297
 See application file for complete search history.

(56) References Cited

U.S. PATENT DOCUMENTS

| | | | | |
|---|---|---|---|---|
| 5,754,840 | A | * | 5/1998 | Rivette et al. .......................... 1/1 |
| 6,014,663 | A | * | 1/2000 | Rivette et al. ................. 707/690 |
| 6,038,561 | A | * | 3/2000 | Snyder et al. .......................... 1/1 |
| 8,036,493 | B1 | * | 10/2011 | Neustel ......................... 382/297 |
| 8,160,306 | B1 | * | 4/2012 | Neustel ......................... 382/113 |
| 2005/0210009 | A1 | * | 9/2005 | Tran .................................. 707/3 |

\* cited by examiner

*Primary Examiner* — Utpal Shah
(74) *Attorney, Agent, or Firm* — Novak Druce Connolly Bove + Quigg LLP

(57) ABSTRACT

A method for automatically typesetting patent images extracts a brief introduction of each patent image from a description part of a patent document, and records a keyword of the brief introduction. The method distinguishes an image label of each patent image from an image part of the patent document. The method rotates the patent image by ninety degrees clockwise in response that the image label of the patent image does not contain the keyword, and outputs the rotated image onto a display device.

9 Claims, 2 Drawing Sheets

COMPUTING DEVICE AND METHOD FOR AUTOMATICALLY TYPESETTING PATENT IMAGES

BACKGROUND

1. Technical Field

Embodiments of the present disclosure generally relate to typesetting technology, and more particularly to a computing device and a method for automatically typesetting patent images.

2. Description of Related Art

Usually, patent images in a patent document are displayed according to a proportion of height and width of each patent image. If the width of one patent image is greater than the height of the patent image, the patent image may be counter-clockwise rotated by ninety degrees. It is inconvenient for users to read the patent document because they have to rotate the patent image clockwise first.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
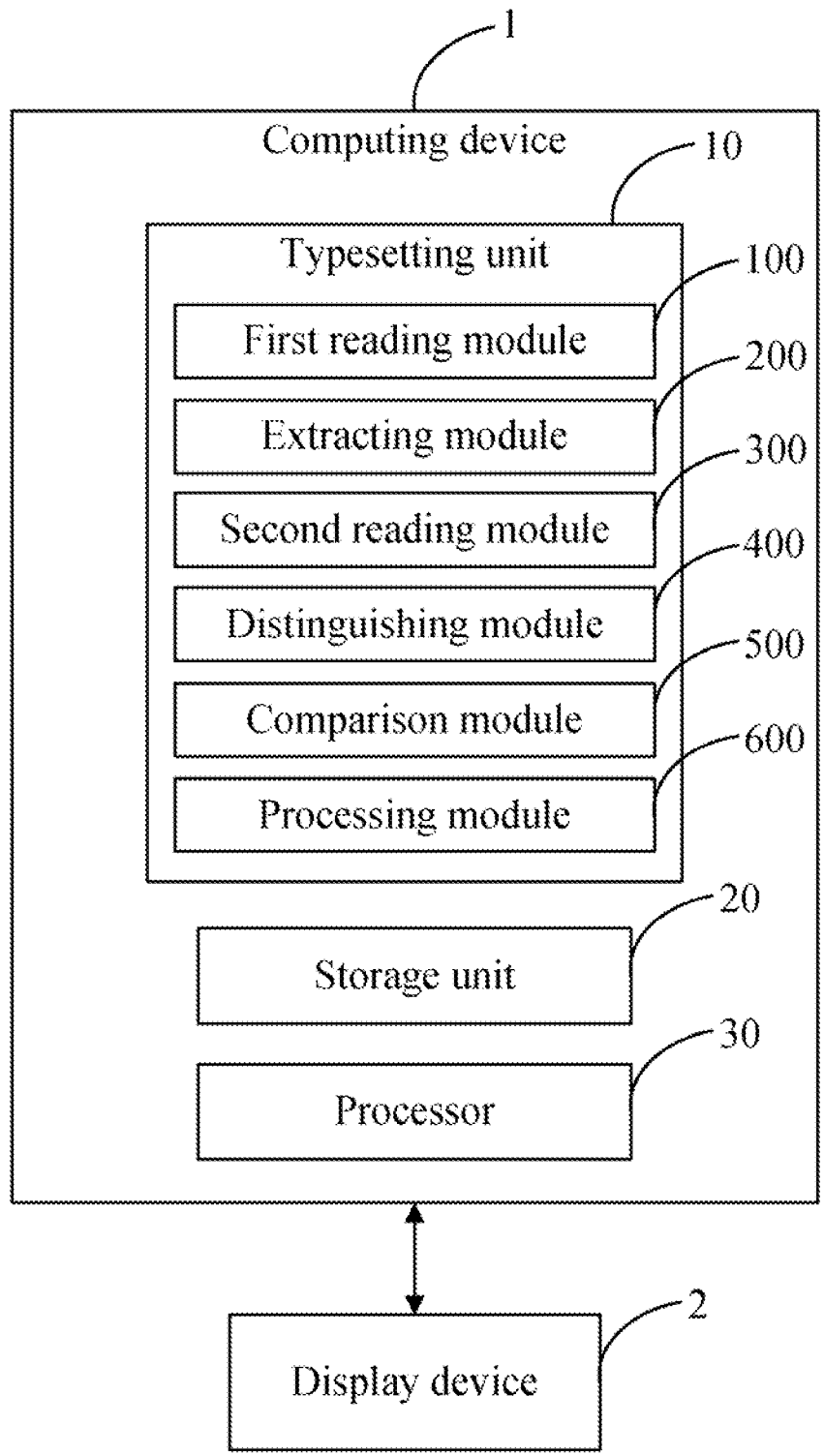
FIG. 1 is a block diagram of one embodiment of a computing device including a typesetting unit for automatically typesetting patent images.

FIG. 1 is a block diagram of one embodiment of a computing device 1 including a typesetting unit 10 for automatically typesetting patent images. The computing device 1 further includes a storage unit 20 and a processor 30. The computing device 1 electrically connects to a display device 2.

The storage unit 20 is operable to store patent documents (e.g., patent publications, and issued patents). Each of the patent documents includes a description part (e.g., the detailed description) and an image part. The image part includes one or more images of an invention of the patent document ("patent images"). The patent documents may be in various formats such as PDF or text.

In one embodiment, the typesetting unit 10 may include one or more function modules (detailed description given below). The one or more function modules may comprise computerized code in the form of one or more programs that are stored in the storage unit 20, and executed by the processor 30 to provide the functions of the typesetting unit 10 described later. The storage unit 20 may be a cache or a memory, such as an EPROM or a flash memory.

In one embodiment, the typesetting unit 10 includes a first reading module 100, an extracting module 200, a second reading module 300, a distinguishing module 400, a comparison module 500, and a processing module 600.

The first reading module 100 is operable to read a description part of a patent document. It is understood that the description part includes text of the detailed description of the patent document. The description part may also include description of the prior art, claims, and abstract depending on the embodiment.

The extracting module 200 is operable to extract a brief introduction of each patent image from the description part of the patent document, and record a keyword of the brief introduction of each patent image. In some embodiments, the brief introductions of patent images can be extracted according to a regular expression. For example, the brief introductions of patent images in US patents may be: "FIG. 1A shows a side view of a single unit auto rack rail road car". The extracting module 200 extracts the regular expression which includes a label of the patent image, where the label of the patent image includes a fixed phrase "FIG" and a number (such as "1A"), and records the fixed phrase "FIG" or the label of the patent image (such as "FIG. 1A") as the keyword of the brief introduction of the patent image.

The second reading module 300 is further operable to read all images in an image part of the patent document. All of the images may include reading just one image if the patent document only has one image or reading multiple images if the patent document includes multiple images.

The distinguishing module 400 is operable to distinguish an image label for each patent image from the image part. The image labels, such as "FIG. 1A" and "FIG. 1B", are at the bottom of the patent images. In one embodiment, the distinguishing module 400 distinguishes the image labels by Optical Character Recognition (OCR) technology. If one patent image is not displayed in the right direction (i.e., the wrong direction), the distinguishing module 400 records that the image label is NULL. The wrong direction of the one patent image may be defined if width of one patent image is greater than height of the patent image, thus the user may desire the patent image to be rotated counter-clockwise by ninety degrees in the patent document.

The comparison module 500 is operable to compare the image label of each patent image with the keyword of the brief introduction of the patent image, and determine whether the image label contains the keyword.

The processing module 600 is operable to rotate the patent image by ninety degrees clockwise when the image label of the patent image does not contain the keyword, and then output the rotated image on the display device 2. For example, the image label of one patent image is NULL, and the keyword is "FIG", so the image label does not contain the keyword, and the processing module 600 rotates the patent image by ninety degrees clockwise and then outputs the rotated image on the display device 2.

The processing module 600 is further operable to output the patent image on the display device 2 when the image label of the patent image contains the keyword of the brief introduction of the patent image. For example, the image label of one patent image is "FIG. 1A", and the keyword of the brief introduction of the patent image is "FIG", so the image label contains the keyword, and the processing module 600 outputs the patent image on the display device 2.

Figure 2:
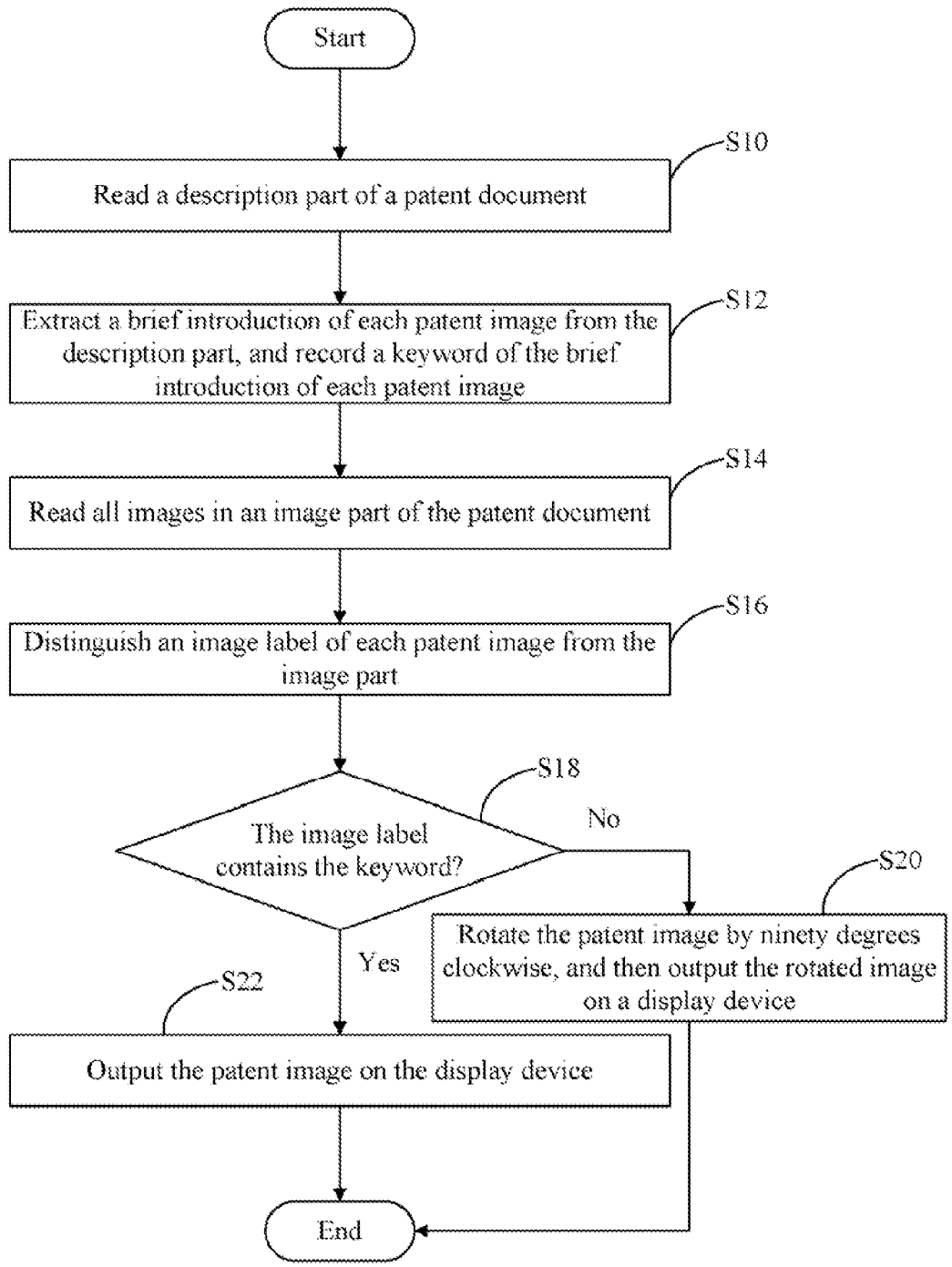
FIG. 2 is a flowchart of one embodiment of a method for automatically typesetting patent images.

FIG. 2 is a flowchart of one embodiment of a method for automatically typesetting patent images. Depending on the embodiment, additional blocks may be added, others removed, and the ordering of the blocks may be changed.

In block S10, the first reading module 100 reads a description part of a patent document.

In block S12, the extracting module 200 extracts a brief introduction of each patent image from the description part of the patent document, and record a keyword of the brief introduction of each patent image.

In block 514, the second reading module 300 reads all images in an image part of the patent document.

In block S16, the distinguishing module 400 distinguishes an image label for each patent image from the image part. If one patent image is not displayed in the right dimension, the distinguishing module 400 records that the image label is NULL.

In block 518, the comparison module 500 compares the image label of each patent image with the keyword of the brief introduction of the patent image, and determine whether the image label contains the keyword. If the image label of the patent image does not contain the keyword, block S20 is implemented. Otherwise, if the image label of the patent image contains the keyword, block S22 is implemented.

In block S20, the processing module 600 rotates the patent image by ninety degrees clockwise, and then outputs the rotated image on the display device 2. For example, the image label of one patent image is NULL, and the keyword is "FIG", so the image label does not comprise the keyword, and the processing module 600 rotates the patent image by ninety degrees clockwise and then outputs the rotated image on the display device 2.

In block S22, the processing module 600 outputs the patent image on the display device 2. For example, the image label of one patent image is "FIG. 1A", and the keyword of the brief introduction of the patent image is "FIG", so the image label contains the keyword, and the processing module 600 outputs the patent image on the display device 2.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A method being processed by a processor of a computing device for automatically typesetting patent images, the method being performed by execution of computerized instructions by the processor of the computing device, the method comprising:
   (a) reading a description part of a patent document using the computing device;
   (b) extracting a brief introduction of each patent image from the description part, and recording a keyword of the brief introduction of each patent image;
   (c) reading all images in an image part of the patent document using the computing device;
   (d) distinguishing an image label of each patent image from the image part, the image label of a patent image being recorded as NULL when width of the patent image is greater than height of the patent image;
   (e) comparing the image label of each patent image with the keyword of the brief introduction of the patent image, and determining whether the image label contains the keyword; and
   (f) rotating the patent image by ninety degrees clockwise in response that the image label of the patent image does not contain the keyword, and outputting the rotated image on a display device.

2. The method as claimed in claim 1, the method further comprising:
   outputting the patent image on the display device in response that the image label of the patent image contains the keyword.

3. The method as claimed in claim 1, wherein in response that width of a patent image is greater than height of the patent image, thus the user desire the patent image to be rotated counter-clockwise by ninety degrees in the patent document.

4. A non-transitory storage medium storing a set of instructions, the set of instructions capable of being executed by a processor to perform a method for automatically typesetting patent images, the method comprising:
   (a) reading a description part of a patent document;
   (b) extracting a brief introduction of each patent image from the description part, and recording a keyword of the brief introduction of each patent image;
   (c) reading all images in an image part of the patent document;
   (d) distinguishing an image label of each patent image from the image part, the image label of a patent image being recorded as NULL when width of the patent image is greater than height of the patent image;
   (e) comparing the image label of each patent image with the keyword of the brief introduction of the patent image, and determining whether the image label contains the keyword; and
   (f) rotating the patent image by ninety degrees clockwise in response that the image label of the patent image does not contain the keyword, and outputting the rotated image on a display device.

5. The non-transitory storage medium as claimed in claim 4, wherein the method further comprising:
   outputting the patent image on the display device in response that the image label of the patent image contains the keyword.

6. The non-transitory storage medium as claimed in claim 4, wherein in response that width of a patent image is greater than height of the patent image, thus the user desire the patent image to be rotated counter-clockwise by ninety degrees in the patent document.

7. A computing device, the computing device comprising:
   a storage unit;
   at least one processor; and
   one or more programs stored in the storage unit, executable by the at least one processor, the one or more programs comprising:
   a first reading module operable to read a description part of a patent document;
   an extracting module operable to extract a brief introduction of each patent image from the description part, and record a keyword of the brief introduction of each patent image;
   a second reading module operable to read all images in an image part of the patent document;
   a distinguishing module operable to distinguish an image label of each patent image from the image part, the image label of a patent image being recorded as NULL when width of the patent image is greater than height of the patent image;
   a comparison module operable to compare the image label of each patent image with the keyword of the brief introduction of the patent image, and determine whether the image label contains the keyword; and
   a processing module operable to rotate the patent image by ninety degrees clockwise in response that the image label of the patent image does not contain the keyword, and output the rotated image on a display device.

8. The computing device as claimed in claim 7, wherein the processing module further operable to output the patent image on the display device in response that the image label of the patent image contains the keyword.

9. The computing device as claimed in claim 7, wherein in response that width of a patent image is greater than height of the patent image, thus the user desire the patent image to be rotated counter-clockwise by ninety degrees in the patent document.

\* \* \* \* \*